United States Patent [19]

Tsukui et al.

[11] Patent Number: 4,612,261

[45] Date of Patent: Sep. 16, 1986

[54] FUEL CELL BATTERY USING ACIDIC ELECTROLYTE

[75] Inventors: Tsutomu Tsukui, Hitachi; Toshio Shimizu, Katsuta; Ryouta Doi, Naka, all of Japan

[73] Assignee: Hitachi, Ltd., Tokyo, Japan

[21] Appl. No.: 410,603

[22] Filed: Aug. 23, 1982

[30] Foreign Application Priority Data

Aug. 21, 1981 [JP] Japan ................. 56-130316
Aug. 26, 1981 [JP] Japan ................. 56-132800

[51] Int. Cl.$^4$ ............................................. H01M 8/04
[52] U.S. Cl. .................................. 429/13; 429/23
[58] Field of Search ............ 429/13, 22, 46, 23, 429/34, 41

[56] References Cited

U.S. PATENT DOCUMENTS

| | | | |
|---|---|---|---|
| 3,498,844 | 3/1970 | Sanderson | 429/13 |
| 3,553,023 | 1/1971 | Doyle | 429/22 |
| 3,553,026 | 1/1971 | Winsel | 429/13 |
| 3,556,857 | 1/1971 | Poirier et al. | 429/13 |
| 3,765,946 | 10/1973 | Werner et al. | 429/34 |
| 4,262,063 | 4/1981 | Kudo et al. | 429/46 |

*Primary Examiner*—Donald L. Walton
*Attorney, Agent, or Firm*—Antonelli, Terry & Wands

[57] ABSTRACT

The disclosure is concerned with a fuel cell battery of an acidic electrolyte type, which comprises means for controlling the flow rate of an oxygen-containing gas, such as air, to be fed to an oxidant electrode of the fuel cell battery in a quantity to completely remove water that is formed on the oxidant electrode by the reaction between fuel and the oxidant from the oxidant electrode. The fuel cell battery prevents lowering of the battery performance due to accumulated water on the oxidant electrode. Also disclosed is means for removing the gas formed at the fuel electrode of the fuel cell from the fuel chamber.

23 Claims, 14 Drawing Figures

FIG. 7
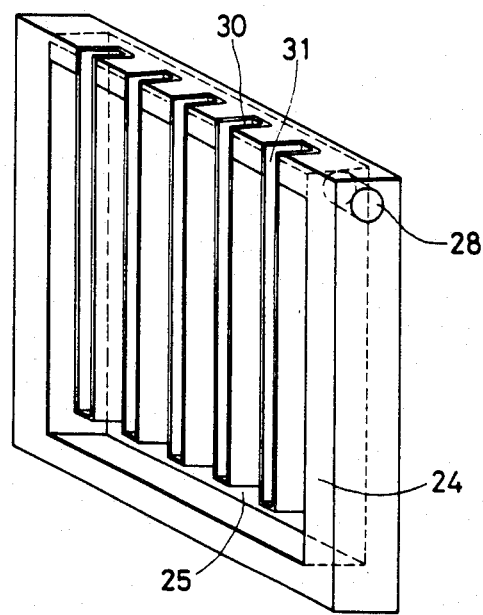
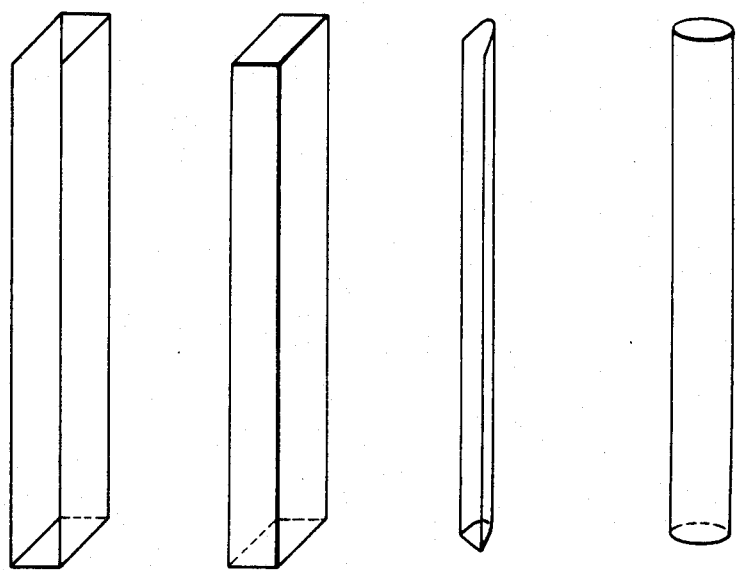
FIG. 8a  FIG. 8b  FIG. 8c  FIG. 8d

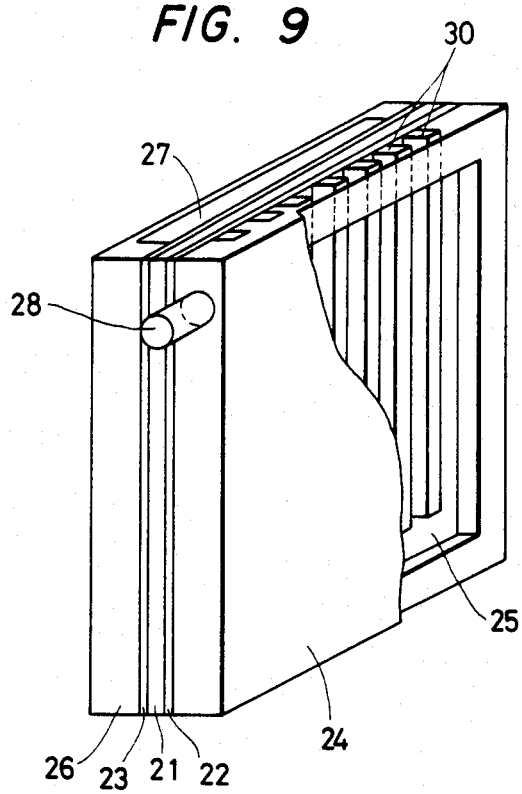
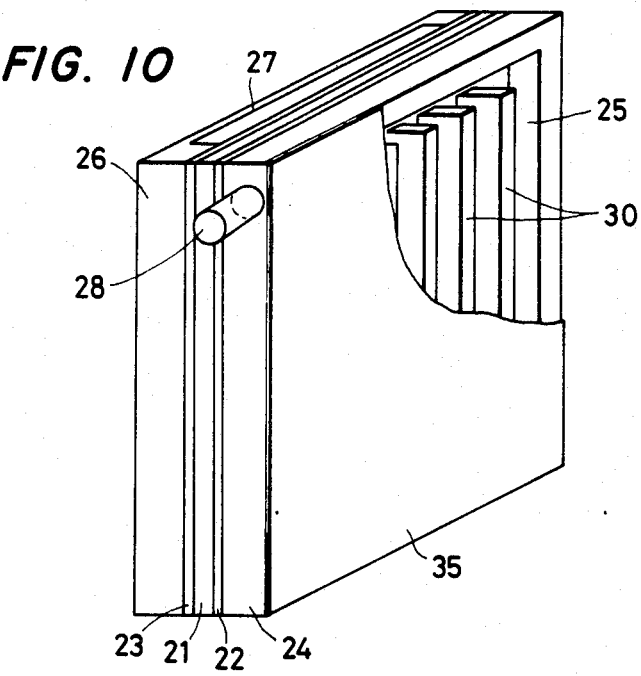

FUEL CELL BATTERY USING ACIDIC ELECTROLYTE

BACKGROUND OF THE INVENTION

This invention relates to a fuel cell battery using an acidic electrolyte as the electrolyte. More particularly, the present invention relates to a method of controlling the flow rate of air to be supplied to an oxidant electrode and discharging, e.g., carbon dioxide gas generated on a fuel electrode in order to suitably discharge the water generated to the oxidant electrode.

A fuel cell battery generally, as well known, consists of a fuel electrode, an oxidant electrode and an electrolyte disposed between these electrodes, and includes a fuel chamber for feeding fuel to the fuel electrode in combination with an air chamber for feeding an oxidant to the oxidant electrode. (The negative electrode is generally referred to as an "air electrode" because a gas containing oxygen, particularly air, is generally employed.)

U.S. Pat. Nos. 3,935,028, 3,992,223, 4,160,856, for example, disclose a fuel cell battery operating at a temperature near room temperature which uses an alkali electrolyte. When methanol is used as the fuel, the cell reaction can be expressed by the formulas:

At the air electrode:

$$2O_2 + 4H_2O + 8e \rightarrow 8OH^- \tag{1}$$

At the fuel electrode:

$$CH_3OH + 8OH^- \rightarrow CO_3^{2-} + 6H_2O + 8e \tag{2}$$

According to the cell reaction expressed as above, water is consumed on the oxidant electrode in accordance with formula (1). Hence, it is necessary to prevent the evaporation of water by limiting the flow rate of the air to the amount required as the oxidant.

Among fuel cell batteries using an acidic electrolyte (phosphoric acid), there is a hydrogen-oxygen fuel cell battery which is operated at a high temperature (190° C. or above). The cell reaction of this type is expressed by the following formulas:

At the fuel electrode:

$$H_2 \rightarrow 2H^+ + 2e \tag{3}$$

At the oxidant electrode:

$$\tfrac{1}{2}O_2 + 2H^+ + 2e \rightarrow H_2O \tag{4}$$

Accordingly, water is generated on the oxidant electrode as expressed by the formula (4).

As will be described elsewhere, however, the saturated vapor pressure of the air to be fed as the oxidant is high because the temperature is high, and the air may be fed only in amounts necessary as the oxidant.

As described above, it has been necessary conventionally to feed the air as the oxidant which is necessary for generating the power at the oxidant electrode.

If the fuel cell battery using an acidic electrolyte is operated near the normal temperature, the air required for discharging the resulting water must be fed to the oxidant electrode besides the air which is necessary as the oxidant for the power generation.

Unless the resulting water is discharged, it accumulates on the surface of the oxidant electrode and prevents air from reaching the electrode so that the oxidation reaction cannot proceed and the cell performance is reduced.

Though a fuel cell battery using an acidic electrolyte which is to be operated near the normal temperature has been examined in the past, no examination about the amount of air to be fed to the oxidant electrode has been disclosed.

On the other hand, in fuel cell batteries for direct power generation which use a liquid such as methanol or hydrazine as the fuel, carbon dioxide gas or nitrogen gas is generated as a result of the chemical reaction on the fuel electrode and the resulting gas is exhausted into a fuel chamber adjacent the fuel electrode lest the resulting gas cover the surface of the fuel electrode and inhibit the supply of the fuel to the fuel electrode. There are two known methods of discharging the resulting gas from the fuel chamber outside the battery. According to a first method, an opening is bored at the upper part of the fuel chamber. The second circulates the fuel inside the fuel chamber, or circulates a liquid mixture of the fuel and the electrolyte by means of a pump or the like disposed outside the battery. The second method also takes the resulting gas out from the fuel chamber together with the liquid mixture of the fuel and the electrolyte and discharges the mixture outside the battery from a gas separator disposed in the circulation path. In the first method, the battery cannot be used in all postures because the opening is defined at the upper part of the fuel chamber. The second method has the drawbacks that a pump is necessary for circulating the liquid mixture of the fuel and electrolyte and the separator for separating the resulting gas from the liquid mixture of the fuel and electrolyte must be disposed in the circulation system for the liquid mixture.

SUMMARY OF THE INVENTION

It is an object of the present invention to provide a fuel cell battery equipped with means for controlling the optimal air flow rate to the oxidant electrode in order to operate the battery with a high level of performance.

It is another object of the present invention to provide a direct power generation type fuel cell battery which separates the resulting gas formed on the fuel electrode from the liquid such as the fuel inside the fuel chamber, and discharges the gas to outside the battery.

In a fuel cell battery which includes an acidic electrolyte and in which the cell reaction is carried out at a temperature of 100° C. or below by feeding a gas containing oxygen to the oxidant electrode, the gist of the present invention resides in a fuel cell battery in which the vapor pressure and flow rate of the gas containing oxygen fed to the oxidant electrode are controlled to a level sufficient but not excessive for discharging the water generated on the oxidant electrode by the battery reaction from the oxidant electrode.

Besides the water content adjusting function described above, the fuel cell battery in accordance with the present invention eliminates the resulting water that is generated as a result of the electro-chemical reaction. Further, the fuel cell battery eliminates the resulting gas that would prevent the supply of fuel to the fuel electrode, which would thus result in a lowering in the battery performance due to the fuel shortage. The fuel cell battery of the invention may also include a resulting gas separation layer inside or bordering the fuel chamber as a means for sealing the fuel chamber without circulating the fuel or a mixture of the fuel and the electrolyte, and discharges the resulting gas to outside the fuel chamber through the separation layer.

These and other objects, features and advantages of the present invention will become more apparent from the following description taken in conjunction with the accompanying drawings.

BRIEF DESCRIPTION OF THE DRAWINGS

FIGS. 6, 9, 10 and 11 are perspective views, each showing an embodiment of the present invention; and FIGS. 7 and 8a, 8b, 8c and 8d are partial views useful for explaining the details of the embodiment shown in FIG. 6.

DESCRIPTION OF THE PREFERRED EMBODIMENTS

Figure 1:
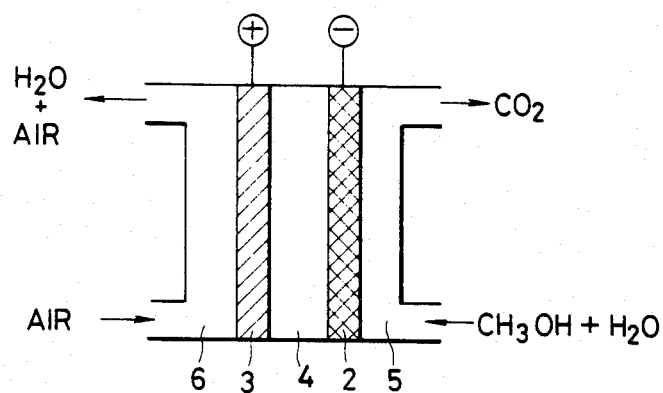
FIG. 1 is a wiring diagram useful for explaining the principle of a fuel cell battery using an acidic electrolyte.

The prinicple of the fuel cell battery which uses an alcohol, especially methanol, or formaldehyde as the fuel and an acidic electrolyte such as sulfuric acid or hydrochloric acid is shown in FIG. 1 and the reaction formula can be expressed as:

At the fuel electrode 2:

$$CH_3OH + H_2O \rightarrow CO_2 + 6H^+ + 6e \quad (5)$$

At the air electrode 3:

$$(3/2)O_2 + 6H^+ + 6e \rightarrow 3H_2O \quad (6)$$

In case of formaldehyde, at the fuel electrode 2:

$$HCHO + H_2O \rightarrow CO_2 + 4H^+ + 4e \quad (7)$$

At the air electrode 3:

$$O_2 + 4H^+ + 4e^- \rightarrow 2H_2O \quad (8)$$

Here, it is necessary to remove and discharge water generated at the air electrode 3 using the vapor pressure of the air to be sent to the air chamber 6. Three mols of water W is generated on the air electrode 3 per mol of methanol in the quantity per unit cell (e.g., in grams/minute.cell) as expressed by the following formula:

$$W = 5.60 \times 10^{-3} I \text{(g.min·cell)} \quad (9)$$

where I(A) is the output current of the battery.

On the other hand, the air flow rate $Q_{NO}$ (the air flow rate under standard conditions) expressed by the following formula is necessary in order to feed the necessary oxygen to the air electrode 3:

$$Q_{NO} = 1.734 \times 10^{-2} I \text{(l/min·cell)} \quad (10)$$

(In equation (10), the moisture content in the air is considered zero.)

The relation between the current I and W and between I and $Q_{NO}$ expressed by formulas (9) and (10) also applies to formulas (3) and (4).

The air flow rate $Q_{NW}$ for discharging the resulting water W expressed by formula (7) by use of the vapor pressure of the air to be fed to the air chamber 6 will be now examined.

Figure 2:
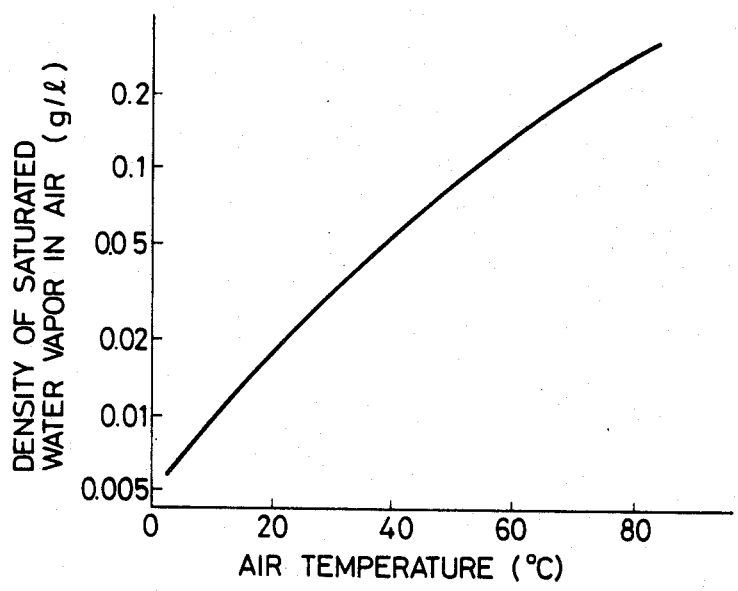
FIG. 2 is a graph showing the relation between the air pressure and the density of the saturated water vapor in the air.

The density $g_w$ of the water at the saturated vapor pressure in the air at a temperature T(°C.) satisfies the relation shown in FIG. 2 from the disclosure of the reference ("Rika Nenhyo (1979)", edited by Tokyo Astronomical Observatory, published by Maruzen K.K.) and hence, an experimental formula (9) can be obtained:

$$g_w = 8 \times 10^{-4} \times 10^{-0.37^{0.5}} \text{(g/l)} \quad (11)$$

(Temperature range is from 20° C. to 100° C.)

Accordingly, the air flow rate $Q_{NW}$ (under the standard conditions) can be expressed by the following formula (12) from formulas (9) and (11):

$$Q_{NW} = W/g_w = 7 \times 10^{-0.37^{0.5}} \times I \text{(l/min·cell)} \quad (12)$$

wherein T represents a gas temperature (°C.) at an outlet of an oxidant chamber.

The water generated on the air electrode 3 can be completely removed and discharged effectively by feeding an amount of air exceeding the air flow rate $Q_{NW}$ expressed by formula (12) to the air chamber 6.

In practice, however, the air expressed by formula (10) is required for the power generation. Hence, the optimal air flow rate $Q_N$ to be fed to the air chamber 6 in order to operated the battery under the high performance conditions will be examined.

If the temperature T is low (80.5° C. or below), oxygen necessary for the oxidation reaction is consumed in addition to the $Q_{NW}$ expressed by the formula (12). Hence, the air to supplement this consumption must be fed to the air chamber 6. In this case, $Q_N$ can be expressed by the formula:

$$Q_N = Q_{NW} + Q_{NO}/5 \quad (13)$$

If the temperature is high (80.5° C. or above), the vapor pressure becomes predominant and air necessary for the oxidation reaction may be supplied, giving the formula:

$$Q_N = Q_{NO} \quad (14)$$

Figure 3:
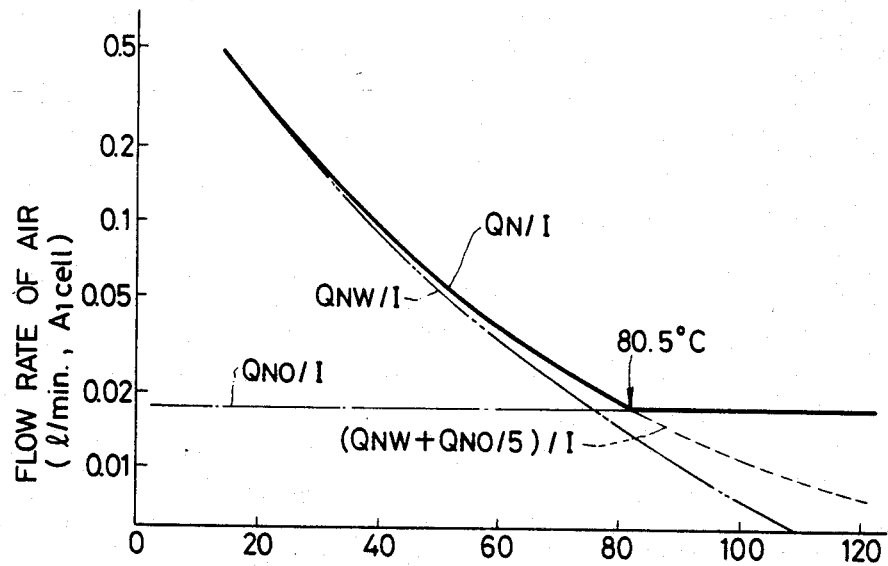
FIG. 3 is a graph showing the relation between the air temmperature and air flow rate inside the air chamber of a fuel cell.

The above relations are shown in FIG. 3 wherein, $Q_N/I$ is the value represented by the solid line.

It is apparent from FIG. 3 that the moisture content in the air to be fed has a relatively small effect on cell performance below about 60° C., because the necessary amount of air is much larger than $Q_{NO}/I$.

On the other hand, the apparent moisture content (relative humidity) in the air in the oxidant chamber becomes small as the temperature of the air in the oxidant chamber increases. For example, when an air of 90% moisture content (density: about 0.03 g/l) is fed to the air chamber at 80° C., it is rapidly heated up to 80° C. As a result, the relative humidity of the fed air becomes 10% (density about 0.3 g/l). Accordingly, the effect of moisture content on cell performance is substantially small at a temperature above about 60° C.

Accordingly, the air flow rate necessary for battery operation is one that exceeds $Q_N$ and is expressed by formulas (13) and (14).

It can be understood from the above-mentioned examination that in a fuel cell battery which uses an acidic electrolyte and is to be operated at a low temperature of 100° C. or below, the battery can be operated with a high level of performance by setting the air flow rate to be fed to the air chamber so as to satisfy the following formula (15):

$$Q_N = 5 \times 10^{-0.3T0.5} \times I (1/\text{min·cell}) \quad (15)$$

The flow rate of air represented by formula (15) is the minimum value. Accordingly, the air must be fed to the air chamber in an amount larger than the amount determined by formula (15). The amount of air calculated by formula (15) is an amount of air whose moisture content is zero. Therefore, in practical cases (i.e. the moisture content may change from about 10% to about 90%), the amount of air to be fed should be increased in accordance with the moisture content.

The study by the inventors has revealed that the quantity of oxygen-containing gas to be fed to the oxidant electrode should preferably be within the range expressed by the following equation:

$$Q_N = (6 \sim 20) \times 10^{-0.3T0.5} \times I (1/\text{min·cell}) \quad (14)$$

By controlling the quantity of the range mentioned above, the state of wetness or the amount of water on the oxidant electrode is controlled adequately. When the $Q_N$ exceeds $20 \times 10^{-0.3T0.5} \times I(1/\text{min·cell})$, the oxidant electrode is too dry. When the quantity $Q_N$ is less than $6 \times 10^{-0.3T0.5} \times I(1/\text{min·cell})$, the oxidant electrode is too wet. The most preferable range of $Q_N$ is from (8 to 15)$\times 10^{-0.3T0.5} \times I(1/\text{min·cell})$.

Figure 4:
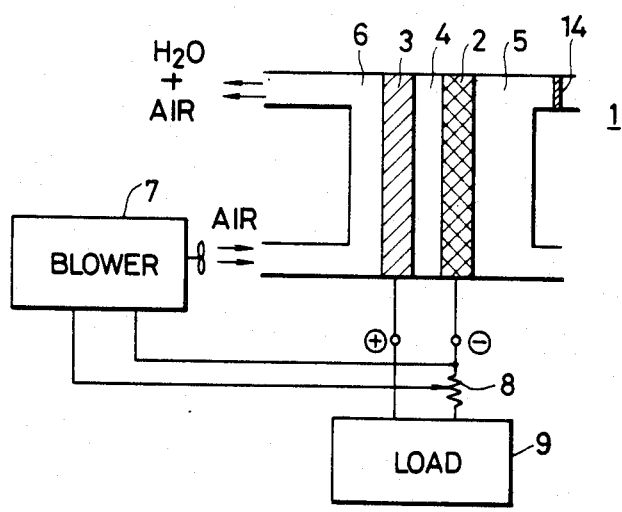
FIGS. 4 and 5 are wiring diagrams, each showing the construction of the air flow rate adjustment of the fuel cell battery in accordance with embodiments of the present invention.

Hereinafter, an embodiment of the present invention will be described with reference to FIG. 4. In FIG. 4, the fuel cell comprises oxidant electrode 3 consisting of porous, water-repellent graphite carrier and catalytic platinum carried thereon, fuel electrode 2 made of the same material as that of oxidant electrode, and a diluted sulfuric acid layer 4 disposed between the electrodes. The materials and methods of producing the electrodes have been well known in the field of fuel cells. As catalysts for electrodes there have been known various metals such as platinum group metals and combinations of platinum group metals and other metals such as tin, ruthenium. FIG. 4 shows the case in which the fuel cell battery is operated at a predetermined temperature. A voltage taken out from part of the wiring connected to a load 9 is applied to the terminal of a blower 7 to provide a terminal voltage for the blower 7 corresponding to a load current. In this case, the air flow rate expressed by formula (15) can be easily obtained by adjusting the terminal voltage of the blower to match the load current by means of an adjuster 8. It is also possible to operate the blower 7 by a voltage circuit (not shown) operated by a voltage signal from the adjuster 8, instead of directly connecting the adjuster to the voltage terminal of the blower 7. According to this system, the air flow rate can be controlled in accordance with changes in the load at a constant temperature using a control circuit (not shown).

The control circuit may comprise a temperature sensor for the gas temperature at an outlet of the oxidant chamber and a controller for controlling a terminal voltage of blower 7 in response to the signal of the temperature sensor.

Figure 5:
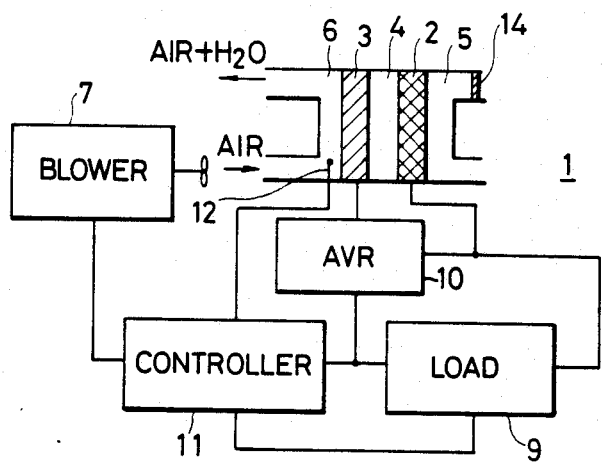

FIG. 5 shows the circuit construction of another embodiment of the present invention which makes it possible to control the air flow rate $Q_N$ in accordance with formula (15) even when the operating temperature T of the battery and the battery current I change.

The circuit includes a constant voltage circuit, AVR 10 (three teminal-positive voltage regulator, MC-78M12AC, manufactured by Motolora connected to the load 9 and a control circuit, controller 11 which is connected to the constant voltage circuit 10 and to the load 9 and can control the temperature (thermocouple 12) inside the air chamber and the terminal voltage of the blower 7 with respect to change in the load current.

The control circuit 11 comprises a temperature sensor and a computing means which produces a signal as an output for controlling the blower speed in response to the sensor signal.

The sensor signal is first compared with predetermined levels by a comparator so that a necessary level can be determined. In accordance with the level signal the output signal for controlling the blower speed is produced.

If this system is employed, the battery operation can be carried out very efficiently even when the load shows a drastic change. Though the control circuit must be additionally disposed, the increase in the space due to the control circuit is extremely small compared with the space required for the apparatus as a whole.

If the air flow rate exceeds the value expressed by formula (15), extremely fine control is not necessary and in practice the number of terminal voltages of the blower 7 can be reduced to a few and sufficiently accomplish the object of control.

In accordance with the present invention, the water generated on the air electrode can be efficiently discharged, the oxidation reaction proceeds effectively and the battery can be operated with high level of performance for extended periods of time. Moreover, the control of the air flow rate required to discharge the water on the air electrode can be effected simply and easily.

Another preferred embodiment of the fuel cell battery of the present invention will now be described. The gas separation means that will be hereinafter described is represented by reference numeral 14 in FIGS. 4 and 5.

Figure 6:
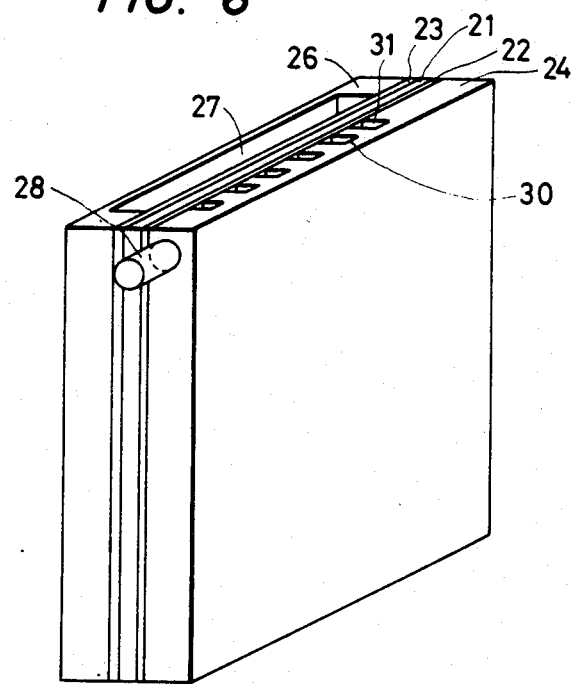

FIG. 6 shows this embodiment of the present invention. The fuel electrode 22 and oxidant electrode 23 oppose each other with an electrolyte chamber 21 between them, the fuel chamber 25 is defined by a fuel chamber frame 24 on the fuel electrode 22 side, and the oxidant chamber 27 is defined by an oxidant chamber frame 26 on the oxidant electrode 23 side. As shown in FIG. 7, the fuel chamber 25 is constructed by the fuel chamber frame 24 consisting of a carbon plate (Hitabate 104, manufactured by Hitachi Chemical Ind., Co.) formed by sintering carbon powder of a polymeric material and a fuel feed port 28 is disposed on the fuel chamber frame 24. The carbon plate is not permeable to gas and liquid. The thickness of the carbon plate may vary in the range of 0.5 to 5 mm. (The port 28 may be disposed either at an upper part or at the lower part of the frame 24.) Thus, the liquid fuel is fed to the fuel chamber 25. Gas passages 31 are defined inside the fuel chamber 25 by a gas separation layer 30 obtained by shaping a porous material which is chemically inert or stable to the electrolyte and fuel and consists of a laminate of carbon fibers or synthetic fibers such as polypropylene fiber into a groove-like duct, and then impregnating the duct with a solution (POLYFLOW, manufactured by Daikin Kogyo, Ltd., Japan. an average particle size: 0.3 μm) formed by dispersing fine particles of polytetrafluoroethylene in water or the like for the purpose of water-repellency. The gas separation layer 30 (or 14 in FIGS. 4 and 5) must be permeable only to gas such as $CO_2$, and has a thickness of, for example, several tens microns to several mm. The gas separation layer 30 cuts off the liquid and permits only gas to pass therethrough. Each gas passage 31 made of the same material as that of gas separator 30 has a shape such as is shown in FIGS. 8a through 8d, and is a square or cylindrical hollow whose bottom is sealed but whose upper surface is open. The gas passage 31 may have a throughhole structure instead of the closed bottom and the duct may extend on both side surfaces instead of the upper surface or may be horizontal. The gas passages 31 are fixed to the fuel chamber frame 24 and are sealed lest the fuel inside the fuel chamber 25 leak. The hollow portion of each gas passage 31 comes into contact with the atmosphere.

When the liquid fuel such as methanol or hydrazine is fed from the fuel feed port 28 to the fuel chamber 25 and then to the fuel electrode 22, carbon dioxide gas in the case of methanol and nitrogen gas in the case of hydrazine as the liquid fuel are generated by the electrochemical reaction. The resulting gas permeates through the gas separation layer 30 and is discharged into the atmosphere through the gas passages 31.

Incidentally, in the shapes of the gas passages 31 shown in FIG. 8, the material that forms the gas passages 31 is not the same as that of the gas separation layer 30 but is the same as that of the fuel chamber frame 24 forming the fuel chamber 25, and its ridge surface is adhered or bonded to the ridge surface in order to prevent the fuel from permeating the hollow portion. Edges of the gas separation layer of e.g. in FIGS. 8a or 8c are in direct contact with the fuel electrode.

In accordance with the above-mentioned embodiment, since the gas generated on the fuel electrode 22 can be easily discharged to the outside through the ducts 31, it does not stay in the fuel chamber 25, and consequently the fuel can be easily fed to the fuel electrode 22 and the battery performance is not reduced.

FIG. 9 shows still another embodiment of the present invention, in which the hollow portion of the hollow gas passage 31 is filled with a solid, porous material made of the same material as that of the gas separation layer 30. This construction expands the range of the shapes that may be employed and permits more effective use of the internal space of the fuel chamber. In this case, the dispostion of the gas separation layer 30 is not limited to the vertical direction, and can be any direction that permits gas discharge, including discharge from the side surfaces.

Figure 11:
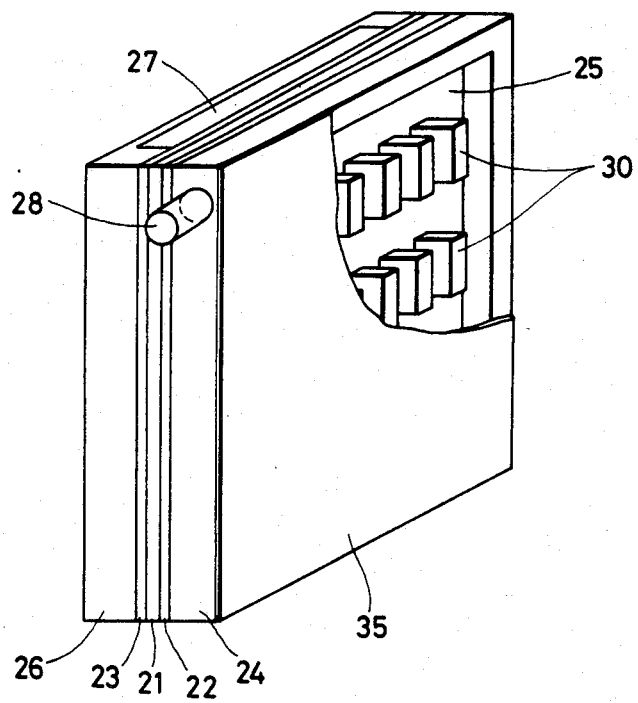

FIGS. 10 and 11 show still other embodiments of the present invention, in which the resulting gas is separated by the separation layer 30 and discharged from the side surfaces of the fuel chamber 25 to the atmosphere. Where a plurality of fuel cells are placed side-by-side or stacked in series, with, e.g., the fuel chamber of one placed adjacent the oxidant chamber 27 of the next adjacent fuel cell, the gas can be discharged through the adjacent oxidant chamber 27 that is next to the fuel chamber of an adjoining cell.

The construction and disposition of the electrolyte chamber 21, oxidant electrode 23 and fuel electrode 22 are the same as those of the embodiment shown in FIG. 6.

The side of the fuel chamber frame 24 opposite the side adjacent to the fuel electrode is covered with a gas permeable film or sheet made of the same material or having the same function as that of the separation layer 30 obtained by subjecting a fibrous material to water-repellency treatment, such as fibrous polytetrafluoroethylene film or sheet marketed by W. L. Gore Co. as GORE-TEX.

In the fuel chamber 25, each separation layer 30 is interposed in such a manner as to come into intimate contact with the fuel electrode 22 and with the diaphragm 35. The battery operation can be attained only by the diaphragm 35 without using the separation layer 30.

In this embodiment, the resulting gas formed on the fuel electrode 22 is separated from the fuel by the separation layer 30 and is discharged through the separation layer 30 and the gas permeable film or sheet 35 made of such as GORE-TEX into the atmosphere.

Hence, the gas does not accumulate in the fuel chamber 25 but permits smooth supply of the fuel. Hence, lowering of the battery performance is prevented. In addition, the fuel chamber to which the liquid fuel is supplied can be sealed with respect to the liquid and the resulting gas can be discharged from the fuel chamber without circulating the fuel liquid or a mixed liquid of the fuel liquid and the electrolyte. The fuel cell battery of the invention enables the elimination of the circulating pump. Thus, the embodiment simplifies the structure, reduces the size and weight of the battery battery and makes it possible to use the battery in all postures.

What is claimed is:

1. A fuel cell battery, using an acidic electrolyte in which the battery reaction is carried out at 100° C. or below, and adapted to utilize a liquid fuel and oxidant gas, comprising said acidic electrolyte, an oxidant electrode and fuel electrode on opposite sides of said acidic electrolyte, wherein upon electro-chemical reaction water is generated at the oxidant electrode and carbon dioxide is generated at the fuel electrode, and means for feeding a fuel to said fuel electrode and means for feeding an oxidant gas to said oxidant electrode, wherein said means for feeding an oxidant gas to said oxidant electrode includes means for controlling the flow rate $Q_N$ of said oxidant gas to be fed to said oxidant electrode in a quantity sufficient to remove the water that is formed on said oxidant electrode by the electro-chemical reaction between fuel and oxidant from said oxidant electrode, said flow rate being $Q_N = (6-20) \times 10^{-0.370 \cdot 5} \times I$ (1/min-cell), where T is a temperature of a gas at an outlet of the oxidant chamber and I is a battery current (A), and T is in the range of 20° C. to 80° C., whereby control of the flow rate of oxidant gas suplied to the oxidant electrode is used to remove said water that is formed on said oxidant electrode and provide optimal cell battery performance.

2. The fuel cell battery as set forth in claim 1, wherein the terminal voltage of a blower is controlled in accordance with the output current of said battery in order to obtain the necessary flow rate of said oxidant gas.

3. The fuel cell battery as set forth in claim 1, including a fuel chamber in contact with the fuel electrode for feeding the fuel to the fuel electrode, which further includes means for selectively discharging the product gas at the fuel electrode formed by the chemical reaction at said fuel electrode to outside of the fuel chamber via a separation layer for separating the gas from the liquid, said separation layer being disposed in said fuel chamber, forming a boundary of said fuel chamber, or both being disposed in and forming a boundary of the fuel chamber.

4. The fuel cell battery using an acidic electrolyte as set forth in claim 3, wherein said means for selectively discharging the product gas includes a duct having a separation layer inside said fuel chamber and means for discharging the product gas separated through said duct to the outside.

5. The fuel cell battery using an acidic electrolyte as set forth in claim 3, in which said separation layer is formed inside said fuel chamber for discharging the product gas at the fuel electrode to the outside.

6. The fuel cell battery using an acidic electrolyte as set forth in claim 3, wherein a plurality of fuel cells are stacked in series each other to form said battery, with an oxidant chamber for feeding the oxidant gas to the oxidant electrode of one cell being positioned adjacent the fuel chamber of an adjacent cell, the adjacent fuel chamber and oxidant chamber being separated by said separation layer, which further includes means for discharging the product gas at the fuel electrode through the oxidant chamber of an adjacent cell via said separation layer.

7. The fuel cell battery as set forth in claim 1, further comprising a fuel chamber adjacent said fuel electrode and means for removing carbon dioxide generated at the fuel electrode, said means for removing carbon dioxide comprising gas removal means for removing the carbon dioxide through said fuel chamber.

8. The fuel cell battery as set forth in claim 7, further comprising an oxidant chamber adjacent said oxidant electrode and means for removing water generated at said oxidant electrode, said means for removing water comprising removal means for removing the water through the oxidant chamber.

9. The fuel cell battery as set forth in claim 1, wherein said means for feeding a fuel to said fuel electrode is a means for feeding a liquid hydrocarbon fuel to said fuel electrode.

10. The fuel cell battery as set forth in claim 9, wherein said liquid is methanol.

11. The fuel cell battery as set forth in claim 9, wherein said liquid is formaldehyde.

12. The fuel cell battery as set forth in claim 1 wherein the acidic electrolyte is a sulfuric acid electrolyte or a hydrochloric acid electrolyte.

13. The fuel cell battery as set forth in claim 1, wherein said means for controlling the flow rate $Q_N$ of said oxidant gas includes circuit means for controlling the air flow rate $Q_N$ even when the operating temperature T and battery current I change.

14. The fuel cell battery as set forth in claim 1, wherein the means for feeding an oxidant gas comprises a means for feeding an oxygen-containing gas.

15. A fuel cell battery, using an acidic electrolyte and adapted to use a liquid as a fuel and an oxidant gas, comprising an oxidant electrode and a fuel electrode, with an acidic electrolyte positioned between and in contact with said oxidant and fuel electrodes, and with means for feeding said liquid hydrocarbon to said fuel electrode, said means for feeding fuel to said fuel electrode including a fuel chamber, for holding said liquid hydrocarbon, in contact with the fuel electrode, said battery further comprising means for selectively discharging a product gas formed by the chemical reaction at said fuel electrode to outside of said fuel chamber via a separation layer for separating the gas from the liquid, said separation layer being positioned either in said fuel chamber, forming a boundary of said fuel chamber, or both being positioned in and forming the boundary of the fuel chamber.

16. The fuel cell battery using an acidic electrolyte as set forth in claim 15, wherein said means for selectively discharging the product gas includes a duct having a separation layer inside fuel chamber and means for discharging the product gas separated through said duct to the outside.

17. The fuel cell battery using an acidic electrolyte as set forth in claim 16, wherein said duct is filled with the material of which said seperation layer is made.

18. The fuel cell battery using an acidic electrolyte as set forth in claim 15, which said separation layer is formed inside said fuel chamber for discharging the product gas at the fuel electrode to the outside.

19. The fuel cell battery using an acidic electrolyte as set forth in claim 15, wherein a plurality of fuel cells are stacked in series to form said battery, with an oxidant chamber for feeding the oxidant gas to the oxidant electrode of one cell being positioned adjacent the fuel chamber of an adjacent cell, the adjacent fuel chamber and oxidant chamber being separated by said separation layer, which further includes means for discharging the product gas at the fuel electrode through the oxidant chamber of an adjacent cell via said separation layer.

20. The fuel cell battery using an acidic electrolyte as set forth in claim 15, wherein said separation layer is made of a material chemically inert or stable to the electrolyte and fuel and permeable to the gas but not to the liquid.

21. The fuel cell battery using an acidic electrolyte as set forth in claim 20, wherein said material chemically inert or stable to the electrolyte and fuel is a porous material of a laminate of carbon or synthetic fibers impregnated with fine particles of polytetrafluoroethylene for water-repellency.

22. A method of operating a fuel cell battery having an acidic electrolyte and in which the battery reaction is carried out at 80° C. or below by feeding an oxidant gas to an oxidant electrode and a liquid fuel to a fuel electrode, including the step of controlling the vapor pressure and flow rate of the oxidant gas fed to the oxidant electrode such that said oxidant gas is fed in a quantity sufficient to remove the water, formed on the oxidant electrode by the reaction between the fuel and the oxidant, from the oxidant electrode, wherein the flow rate $Q_N$ (calculated under the standard state) of said oxygen-containing gas is controlled to be maintained within the range of the quantity expressed by the following formula, where I is a battery current (A) per unit cell of said fuel cell battery and T is the temperature (°C.) of the gas at an outlet of the oxidant chamber:

$$Q_N = (6-20) \times 10^{-0.37 0.5} \times I (1/\text{min·cell}),$$

whereby a gas flow rate necessary for discharging said water is maintained, and whereby control of the vapor pressure and flow rate of said oxidant gas fed to the oxidant electrode is used to remove said water and provide optimal cell battery performance.

23. The method of operating a fuel cell battery as set forth in claim 22, wherein said oxidant gas is an oxygen-containing gas.

* * * * *